Oct. 11, 1932.   W. A. KNOOP   1,881,685
PHASE SHIFTING DEVICE
Filed April 18, 1931
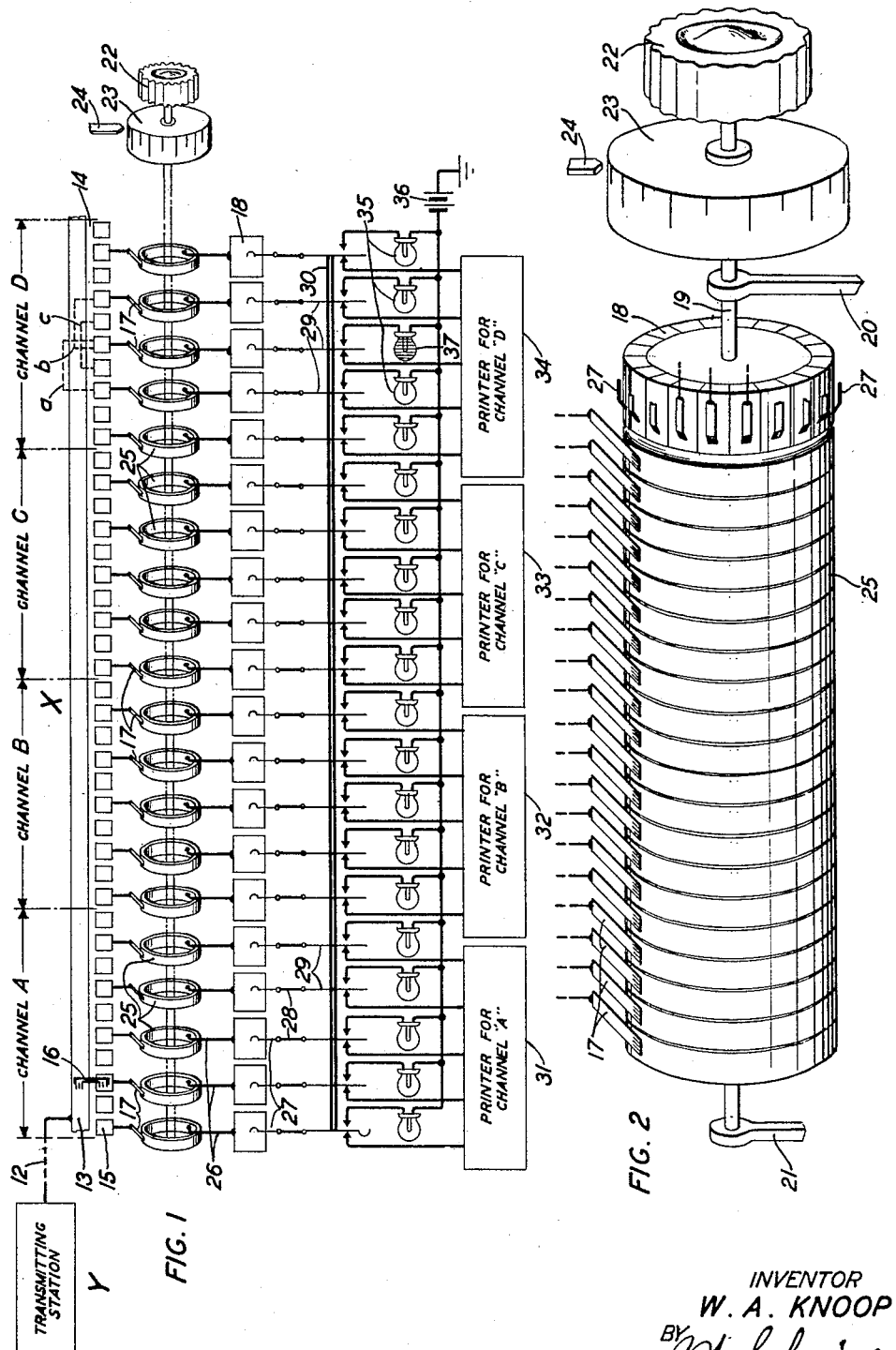
INVENTOR
W. A. KNOOP
BY J.W.Schmied
ATTORNEY Patented Oct. 11, 1932

1,881,685

UNITED STATES PATENT OFFICE

WILLIAM A. KNOOP, OF HEMPSTEAD, NEW YORK, ASSIGNOR TO BELL TELEPHONE LABORATORIES, INCORPORATED, OF NEW YORK, N. Y., A CORPORATION OF NEW YORK

PHASE SHIFTING DEVICE

Application filed April 18, 1931. Serial No. 531,107.

This invention relates to a phase shifting device for use in an impulse transmission system employing synchronously rotating distributing devices. It is particularly useful in high speed printing telegraph systems.

An object of the invention is to facilitate the phase adjustment of synchronously driven rotary distributing devices.

A more specific object of the invention is to establish proper phase relation between a continuously rotating receiving impulse distributing device and incoming signal impulses.

In high speed telegraph systems employing long loaded submarine cables, synchronism between rotary distributors at opposite ends of the cable is maintained by utilizing signal impulses to operate corrector circuits. These corrector circuits are arranged to correct the distributor at the receiving end of the cable either by mechanical means, such as disclosed in G. A. Locke, U. S. Patent No. 1,670,461, issued May 22, 1928, or by continuous electrical means, such as disclosed in U. S. Patent 1,848,180 granted to W. A. Knoop on March 8, 1932. The correction thus effected in both disclosures is gradual and is highly desirable when the receiving distributor is in approximate phase with the incoming signals. However, at the beginning of a transmission period, particularly after a period of non-use, it might be necessary to orient the receiving rings which are usually orientable with respect to the other rings on the same distributor, through a considerable arc to obtain an approximate phase relation with the incoming signals. The amount of orientation may be determined by means of a series of lamps which may be temporarily connected to the receiving distributors as shown in A. M. Curtis Patent 1,689,328, issued October 30, 1928.

According to the present invention the phase relation between the receiving distributor and the incoming signals is established in an expeditious and efficient manner by arranging intermediate the receiving distributor and the printers or lamps a commutator device fixedly mounted on a rotatable shaft. The shaft has also fixedly mounted thereon a series of rings which are insulated from each other and the shaft. Each of the rings is electrically connected in fixed relation to one segment or bar of the commutator. Individual brushes connect the segments of the receiving distributor with the insulated rings and other individual brushes connect the commutator bars with the phasing lamps or the selector magnets of the printers. In this way, connections through the commutator may be varied at will by rotating the commutator in either direction to change the positions of the brushes with respect to the receiving segments and lamps, thereby obtaining the desired phase relation as indicated by the lamps. A switch is provided for disconnecting the lamps and for connecting the printers after the phase relation is obtained.

A better understanding of the invention will be had from the following detailed description and appended claims when taken in conjunction with the accompanying drawing of which, Fig. 1 shows a schematic circuit arrangement of the invention, and Fig. 2 represents an assembly of the commutator adapted for use in Fig. 1.

Like reference characters represent like parts.

Referring to Fig. 1 signal impulses originating at a distant transmitting station Y are impressed over a transmission line 12, onto a continuous ring 13 of the receiving distributor 14 at station X. The distributor 14 comprises, in addition to continuous ring 13, a segmented ring 15 and a rotatable brush 16. The distributor shown provides for receiving signals over four channels of transmission, but it is understood that the distributor may be designed to provide for a greater or a lesser number of channels. Furthermore, the distributor provides to receive signals in accordance with the Baudot or five-unit impulse code, although it is also understood that the distributor is not to be limited to this particular code.

Inasmuch as the distributor shown in Fig.

1 is designed for four channels, the ring 15 contains forty segments, that is, ten for each channel. Alternate segments are fixedly connected to brushes 17 and the remaining segments are left "dead". Should the brush 16 be in phase with the incoming signal impulses, it will be passing over one of the segments connected to a brush 17 at the time the middle portion of a unit length impulse is impressed on the ring 13. This phase relation is known in the art as the true phase in contradistinction to the approximate phase which will be hereinafter described. The segments connected to brushes 17 will be hereinafter referred to as "live" segments.

When it is desired to transmit signals, particularly after a period of non-use, as for example, at the beginning of a day's run, it is usually the practice, first, to establish approximate phase between the distributors at opposite ends of the transmission line. Accordingly, the receiving ring set, such as ring set 14, is made orientable with respect to the other ring set on the same distributor head. In establishing this approximate phase, it is sometimes found necessary to orient the receiving ring set as much as 180°, in order that a complete combination of impulses originating at a transmitter at station Y may be recorded on a corresponding printer at station X. In the present invention this orientation of the receiving ring over a wide range is avoided by providing the commutator device shown in Fig. 2, wherein the commutator ring 18 is fixedly, but insulatively, mounted on a rotatable shaft 19 which is supported by standards 20 and 21. Shaft 19 may be rotated at will in either direction by means of a hand-knob 22, the amount of rotation being indicated by wheel 23 and pointer 24. Fixedly, but insulatively, mounted on shaft 19 and in parallel relation with the commutator ring 18 are twenty individual slip rings 25 which are respectively positioned in engagement with brushes 17. The commutator ring 18 is divided into twenty segments or bars to correspond to the number of slip rings 25 and these bars are respectively connected in fixed relation to the slip rings by means of conductors 26 (Fig. 1). Fixedly positioned in engageable relation with the twenty bars of commutator ring 18 are twenty brushes 27 which are fixedly, but insulatively, mounted on some part of the base structure (not shown), supporting the standards 20 and 21. The brushes 27 are respectively connected by conductors 28 to contacts 29 of gang switchbar 30, which is arranged to be operated by hand to connect either the printers 31, 32, 33 and 34, corresponding respectively to the four channels, or the lamps 35 to the receiving circuit, the lamps 35 serving to indicate the phase relation before the printers are connected.

*Operation of the system*

In multiplex transmission systems, particularly where transmission is over a long submarine cable, and wherein polar signals are employed, the polarity of the marking and spacing impulses are reversed at the end of each channel. When it is desired to start operation after a period of non-use, phasing signals are transmitted by each of the transmitters, in turn, at station Y. These signals may be constituted of various combinations of impulses of positive and negative polarities. For the purpose of illustration, it is assumed that in the first channel, say channel A, the first, second, fourth and fifth impulses are of positive polarity and the third impulse is negative; in the second channels, say channel B, all the five impulses are of negative polarity; in the third channel, say channel C, all the five impulses are of positive polarity; and in the fourth channel, say channel D, the first, second, fourth and fifth impulses are of negative polarity and the third impulse is of positive polarity. The lamps 35 at station X are shown connected to the negative pole of grounded battery 36.

If the receiving distributor brush 16 is in synchronous phase with the incoming signals, it will cause, as it passes over each of the "live" segments of ring 15, a momentary lighting of the first, second, fourth and fifth lamps of channel A, all the five lamps of channel C, and the third lamp of channel D. The remaining lamps which receive from their respectively associated "live" segments, impulses of negative polarity, will not light because of like polarities at opposite ends of their circuits.

However, after a period of non-use, synchronous phase as set forth above, is rarely had, and therefore, it is necessary that the system be adjusted to establish what is known as approximate phase, before the transmission of message signals begins. This is accomplished by providing one lamp with some suitable means such as a transparent red cap, which will be easily distinguished from the remaining nineteen lamps. In the system shown herein, lamp 37 is selected to have the transparent red cap, it being the third lamp in channel D. If the system is in synchronous phase, then, during each revolution of brush 16, red lamp 37 will light and the two adjacent lamps on each side of it, that is, the first, second, fourth and fifth lamps of channel D, will not light. If this condition is not had, as is usually the case, then the commutator ring 18 may be rotated by turning knob 22 in either direction until the desired condition is obtained.

The system is then adjusted for true synchronous phase, that is, the condition wherein the "live" segments are positioned to receive the middle portion, respectively, of the incoming impulses. This adjustment is made by orienting the ring set 14, as is well known in the art, through a small arc. The range of orientation required is at the most a little more than the length of a full signal impulse. In a four-channel system, such as shown herein, this range would be a little more than 18°, say, 27° or 30°. This allows the exact positioning of the receiving segment with respect to the incoming signals without moving the ring set 14 through such a range as to break the leads.

The purpose of the true phase adjustment may be better understood by referring to the segment of channel D shown on ring 15. Here are shown in dotted lines three possible positions of the incoming impulse with respect to the third "live" segment of the channel, which may be obtained by the approximate phasing adjustment. The impulse in its extreme left-hand position which is designated $a$, is received partly on the second and the third "live" segments, the middle or effective portion being received on the "dead" segments between them. However, the portion received on the third segment may be of sufficient strength to cause lamp 37 to flash. Then again the impulse may be received in its extreme right-hand position, designated $b$, wherein the impulse is distributed over the third and fourth "live" segments and the "dead" segments between them. In either of these positions there might be sufficient portions of the impulse received on the third segment to cause lamp 37 to flash. Therefore it is necessary that a further adjustment be made to shift the ring set 14 sufficiently in one or the other direction until the impulse is received in the position designated $c$, wherein the middle portion is received wholly on the third "live" segment. The means for making the last mentioned adjustment is well known in the art. It is therefore seen that the adjustment for true synchronous phase is limited to an angular distance of a little more than 18° for a four-channel system.

What is claimed is:

1. In an impulse transmission system, a phase shifting device comprising individual means for receiving individual impulses, elements for indicating indivdual impulses, and manually operated means electrically connected intermediate said individual means and said elements, arranged to change the connection of each of the individual means from one of said elements to another.

2. In an impulse transmission system comprising means for receiving impulses over a plurality of channels, a plurality of means for respectively recording groups of impulses received over said plurality of channels, means for indicating the phase relation between incoming impulses and said recording means, normally stationary means interconnecting said receiving means and said indicating means comprising a circuit interchanger arranged to be manually rotated to obtain any desired phase relation between the received impulses and said indicating means, and means for connecting to said receiving means the said recording means, in place of said indicating means, when the desired phase relation is obtained.

3. In an impulse transmission system, according to claim 2, wherein the normally stationary means is a rotatable commutator device comprising a shaft, a ring constituted of insulated segments and fixedly mounted on said shaft, a plurality of insulated slip rings arranged in parallel to said segmented ring and fixedly mounted on said shaft, individual electrical connections between said slip rings and said segments, and stationary brushes arranged in engageable relation with each of said slip rings and said segments.

4. In an impulse transmission system according to claim 2, wherein an indicator is provided on said normally stationary means for indicating the amount of rotation given thereto to establish the desired phase relation.

5. In an impulse transmission system, a phase shifting device comprising a distributing device for receiving line impulses, individual means for indicating said received impulses, a rotatable shaft having insulatively mounted thereon and insulated from each other a plurality of members in engagement with a plurality of elements, respectively, on said distributing device, a second distributing device fixedly mounted on said shaft, a plurality of contact elements insulatively mounted on said second distributing device and electrically connected in fixed relation to said plurality of members, respectively, and a plurality of elements for maintaining each of said contact elements in connection with one of said indicating lamps, said shaft being rotatable in either direction to change the connections between said contact elements and said indicating means as desired.

In witness whereof, I hereunto subscribe my name this 15th day of April, 1931.

WILLIAM A. KNOOP.